No. 703,417. Patented July 1, 1902.
E. W. HOLDSOMBECK.
CANE STRIPPER.
(Application filed Apr. 13, 1901.)
(No Model.) 2 Sheets—Sheet 1.

WITNESSES:
A. M. Magruder
M. C. Mayhew

INVENTOR
E. W. Holdsombeck.
BY
ATTORNEYS

No. 703,417. Patented July 1, 1902.
E. W. HOLDSOMBECK.
CANE STRIPPER.
(Application filed Apr. 13, 1901.)
(No Model.) 2 Sheets—Sheet 2.
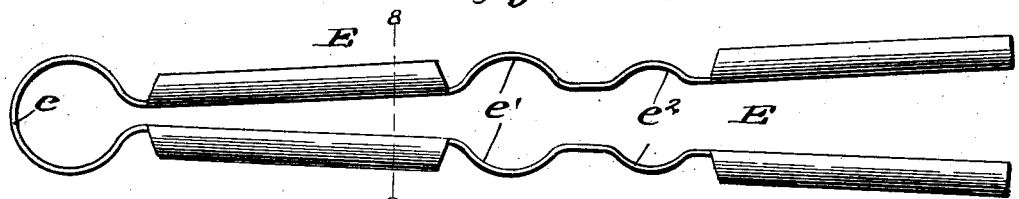
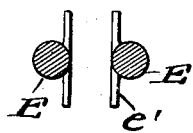
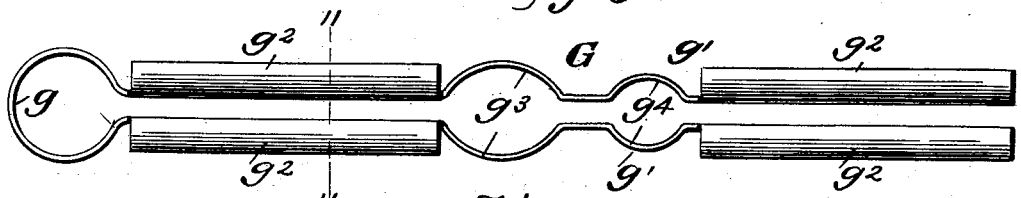
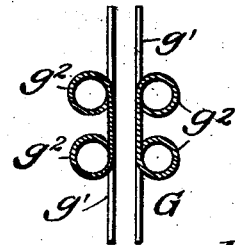
WITNESSES:
A. M. Magrude,
M. C. Mayhew
INVENTOR
E. W. Holdsombeck.
BY
ATTORNEYS

UNITED STATES PATENT OFFICE.

ENOCH WALTER HOLDSOMBECK, OF LAWLEY, ALABAMA.

CANE-STRIPPER.

SPECIFICATION forming part of Letters Patent No. 703,417, dated July 1, 1902.

Application filed April 13, 1901. Serial No. 55,727. (No model.)

*To all whom it may concern:*

Be it known that I, ENOCH WALTER HOLDSOMBECK, a citizen of the United States, residing at Lawley, in the county of Bibb and State of Alabama, have invented a new and useful Cane-Stripper, of which the following is a specification.

My invention is an improved cane-stripper, and has for its object to provide a device in the form of shears for stripping the blades or leaves from stalks.

Preparatory to sending sugar-cane to the mills it is the custom to divest the cane of all the blades, and this is generally done while the stalk is standing in the field, as it has proven the most economical way of stripping them. Heretofore it has been the general custom to do this work by catching the blades separately with the hands and pulling them off. This method is very objectionable, as the hands are often cut by the blades and necessarily makes the work very slow and unprofitable, as it requires the services of many laborers to strip one acre of a field of cane.

By my invention I seek to provide a stripper which is designed to straddle the stalk and with a downward pull all the blades are torn therefrom at one operation, which facilitates the work and saves the hands from injury.

My invention will be described in detail in the accompanying specification and pointed out in the appended claims, reference being had to the drawings, in which—

Figure 1:
Figure 4:
Figure 5:
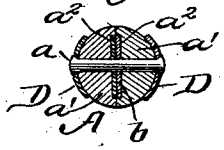
Figure 2:
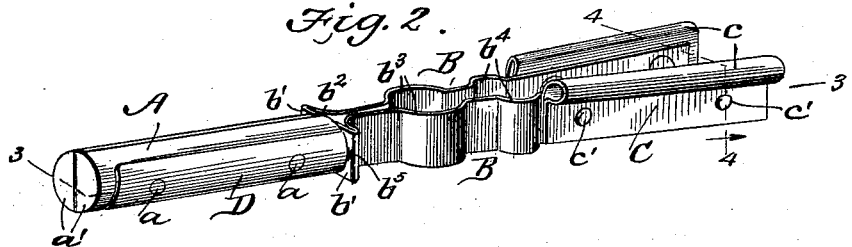
Figure 3:
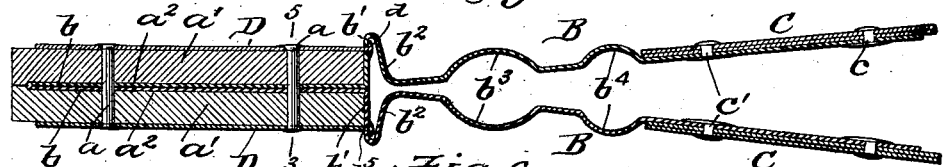
Figure 6:
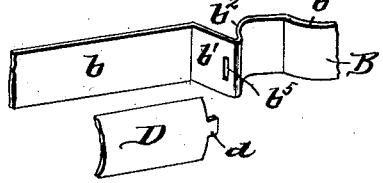

Figure 1 illustrates my invention as in use. Fig. 2 is a perspective view of the same. Fig. 3 is a longitudinal section on the line 3 3 of Fig. 2. Fig. 4 is a detail section on the line 4 4 of Fig. 2. Fig. 5 is a similar view on the line 5 5 of Fig. 3. Fig. 6 is a detail view, hereinafter referred to; and Figs. 7, 8, 9, and 10 are views of slightly different forms of my invention.

Referring now to the drawings, Figs. 1 to 6, A designates the handle portion of my improved cane-stripper, in which are securely held by rivets $a$ the ends of diverging spring-steel arms or blades B. This handle is preferably made in two pieces $a'$ $a'$, which have their adjacent faces cut out, as at $a^2$ $a^2$, in which the ends $b$ of the arms B B are held, the latter being made of one piece of metal bent to form the sections B B, and at a point adjacent to the end of the handle the arms are bent outwardly, as at $b'$, then bent back for a short distance, as at $b^2$, forming springs, and are finally extended in a diverging direction for any suitable length and provided with handles C at their outer ends. The handles C are preferably each made of one piece of sheet metal bent at the middle to form tubular gripping portions $c$. The ends are then pressed together and held to the blades by rivets $c'$ $c'$, as shown.

At intervals between the handles A and C I provide the blades B with semicircular or bowed portions $b^3$ and $b^4$, which are made of different sizes to accommodate stalks of various dimensions.

In order to strengthen the spring end of the blades B, I provide semicircular metal strips D, made to conform to the handle A and held thereto by the same rivets that hold the handle-sections together. The ends of these metal strips are provided with short studs $d^4$, which are designed to enter short slots $b^5$ in the sections $b'$ of the blades B and are bent or hammered down upon the side of the sections $b'$, adjacent to the spring portion $b^2$, thus firmly holding the sections together and preventing the blades breaking at the point where they protrude from the handle.

It will thus be seen that I provide a device that is exceedingly simple, cheap to manufacture, and of such construction that no part thereof is likely to become broken or bent.

The operation of my improvement is as follows: The handle A is grasped in the right hand and the top of the sugar-cane stalk passed between the diverging arms B B until the stalk rests between either of the bowed sections $b^3$ or $b^4$. Then with the left hand the handle-sections C C are caught and pressed together, when the stripper is in position to be passed down the stalk, which is done by lowering the arms, and during such movement the bowed sections strip the blades and tear them from the stalk, which leaves the latter bare and ready to be cut down and sent to the mill.

In Fig. 7 I have illustrated a slightly-different form of stripper, which is made of a single piece of steel rod E, having its middle section flattened out, bent, and tempered to form a spring $e$. A short distance from the ends the rods are also flattened or hammered out and provided with bowed portions $e'$ $e^2$, and in Figs. 9 and 10 I show my stripper as made of a flat piece of steel G, preferably about three inches wide, which is bent at the middle to form a spring $g$, the ends being bent upon themselves into a parallel position, forming arms or blades $g'$ $g'$.

At suitable points on the blades the latter are provided with crosswise cuts or slits, which extend about a third of the way across the blades from the opposite edges thereof, and the sections between these slits are bent to a circular form to form handles, as shown at $g^2$ $g^2$. Between the handles the blades are provided with the usual bowed portions, as shown at $g^3$ $g^4$.

Having thus fully described my invention, what I claim as new, and desire to secure by Letters Patent of the United States, is—

1. In a cane-stripper the combination of a handle-section, diverging spring-arms fixedly held in said handle, strengthening-plates securely fastened to the said handle, handles secured to the said arms at their outer ends, the said arms having bowed sections arranged between the handles and opposite each other which form tubular sections when the arms are pressed together, substantially as shown and described.

2. In a cane-stripper comprising a handle portion, spring-arms diverging therefrom, said arms being formed of one piece of metal bent in the middle to form the said arms, handle portions held upon the free ends of the arms, spring portions formed integral with said arms, and bowed sections arranged on the arms between the handles, substantially as shown and described.

3. In a cane-stripper, the combination of a handle-section composed of two semicircular portions having their inner faces recessed, arms securely held within the said recesses, spring portions formed in the arms adjacent the handle-section, handles secured to the outer or free ends of the arms, bowed portions formed in the said arms and arranged between the said handles, substantially as shown and described.

ENOCH WALTER HOLDSOMBECK.

Witnesses:
J. BEN BARRY,
H. W. GARDNER.